United States Patent
Huang et al.

(10) Patent No.: US 10,559,973 B2
(45) Date of Patent: Feb. 11, 2020

(54) ELECTRONIC DEVICE AND POWER SUPPLY METHOD THEREOF

(71) Applicant: Wistron Corporation, New Taipei (TW)

(72) Inventors: Cheng-Wei Huang, New Taipei (TW); Kuang-Wei Wang, New Taipei (TW); Kai-Cheng Lee, New Taipei (TW); Yen-Hsiang Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 298 days.

(21) Appl. No.: 15/401,099

(22) Filed: Jan. 9, 2017

(65) Prior Publication Data

US 2018/0090985 A1 Mar. 29, 2018

(30) Foreign Application Priority Data

Sep. 23, 2016 (TW) .............................. 105130716 A

(51) Int. Cl.
*H02J 9/06* (2006.01)
*H02J 7/00* (2006.01)

(52) U.S. Cl.
CPC .............. *H02J 9/061* (2013.01); *H02J 7/007* (2013.01)

(58) Field of Classification Search
CPC ....... G06F 1/26; H02J 9/06; H02J 7/00; H02J 7/04; H02J 7/007; H02J 9/061
See application file for complete search history.

(56) References Cited

U.S. PATENT DOCUMENTS

| 2005/0162132 A1* | 7/2005 | Nagasawa | H02J 9/061 320/128 |
| 2014/0268556 A1* | 9/2014 | Lam | G06F 1/1632 361/679.55 |
| 2016/0118802 A1* | 4/2016 | Castillo | H02J 9/06 307/18 |

FOREIGN PATENT DOCUMENTS

TW 201447552 12/2014

OTHER PUBLICATIONS

"Office Action of Taiwan Counterpart Application," dated Jul. 27, 2017, p. 1-p. 9, with English translation thereof, in which the listed references were cited.

* cited by examiner

*Primary Examiner* — Jared Fureman
*Assistant Examiner* — Emmanuel Dominique
(74) *Attorney, Agent, or Firm* — JCIPRNET

(57) ABSTRACT

An electronic device and a power supply method thereof are provided. The electronic device includes a control circuit, a detachable power supply device, and an auxiliary power supply device. The control circuit is coupled to a power supply terminal coupled to a system load. When the detachable power supply device is assembled to the electronic device, the detachable power supply device is coupled to the control circuit and supplies power to the system load. The auxiliary power supply device is coupled to the control circuit. When the electronic device is not turned on and the detachable power supply is removed from the electronic device, the electronic device is not turned on by the auxiliary power supply device. When the electronic device is turned on and the detachable power supply is removed from the electronic device, power is continuously supplied to the system load by the auxiliary power supply device.

11 Claims, 6 Drawing Sheets

ELECTRONIC DEVICE AND POWER SUPPLY METHOD THEREOF

CROSS-REFERENCE TO RELATED APPLICATION

This application claims the priority benefit of Taiwan application serial no. 105130716, filed on Sep. 23, 2016. The entirety of the above-mentioned patent application is hereby incorporated by reference herein and made a part of this specification.

BACKGROUND

Field of the Invention

The invention relates to a power supply technique and more particularly, to an electronic device and a power supply method thereof.

Description of Related Art

Along with development of electronic technology and increasing demand of information, portable electronic devices become indispensable tools in people's daily life. Most of the power required for operating a portable electronic device is provided by a detachable power supply device (e.g., a battery), so that the electronic device is conveniently portable and does not need city power during operation. As more and more portable electronic devices are applied to the industry field, users sometimes forget to replace the detachable power supply devices before the power is run out, which may cause data loss or even damage to the portable electronic devices due to power shortage.

Therefore, many manufacturers are looking forward to a more efficient method to avoid the problems caused by power shortage from occurring to the portable electronic devices.

SUMMARY

The invention provides an electronic device and a power supply method thereof, capable of maintaining operation of an electronic device by an additionally designed auxiliary power supply device when its original power supply device (e.g., a detachable power supply device) is removed, and preventing the portable electronic device from being turned on by using power of the auxiliary power supply device alone.

An electronic device of the invention includes a control circuit, a detachable power supply device, and an auxiliary power supply device. The control circuit is coupled to a power supply terminal, which is coupled to a system load. When the detachable power supply device is assembled to the electronic device, the detachable power supply device is coupled to the control circuit and supplies power to the system load. The auxiliary power supply device is coupled to the control circuit. When the electronic device is not turned on and the detachable power supply is removed from the electronic device, the control circuit does not turn on the electronic device by using the auxiliary power supply device. Meanwhile, when the electronic device is in an on state and the detachable power supply is removed from the electronic device, the control circuit keeps supplying power to the system load by using the auxiliary power supply device.

A power supply method of an electronic device of the invention includes the following steps. Whether the electronic device is turned on is determined. The electronic device includes a detachable power supply device and an auxiliary power supply device. When the electronic device is not turned on and the detachable power supply is removed from the electronic device, the electronic device is not turned on by the auxiliary power supply device. When the detachable power supply device is assembled to the electronic device, the electronic device is turned on and power is supplied to the electronic device by the detachable power supply device. When the electronic device is in the on state and the detachable power supply is removed from the electronic device, power is continuously supplied to the electronic device by the auxiliary power supply device.

To sum up, in the electronic device and the power supply method thereof provided by the invention, the auxiliary power supply device is additionally installed in the electronic device, and through the specially designed circuit, the electronic device is restricted to be turned on only by the detachable power supply device, instead of being turned on by using the power of the auxiliary power supply device alone. In this way, the user is prevented from turning on the portable electronic device by using the auxiliary power supply device with less power, such that the storage capacity of the auxiliary power supply device can be maintained to avoid the accident of data loss caused by power exhaustion. Moreover, during the operation of the electronic device, if the detachable power supply device is removed, the electronic device can still be maintained in the on state through the auxiliary power supply device. Thereby, the electronic device does not have to be shutdown and re-started during the replacement of the detachable power supply device, so to avoid the accident of data loss caused by power exhaustion.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
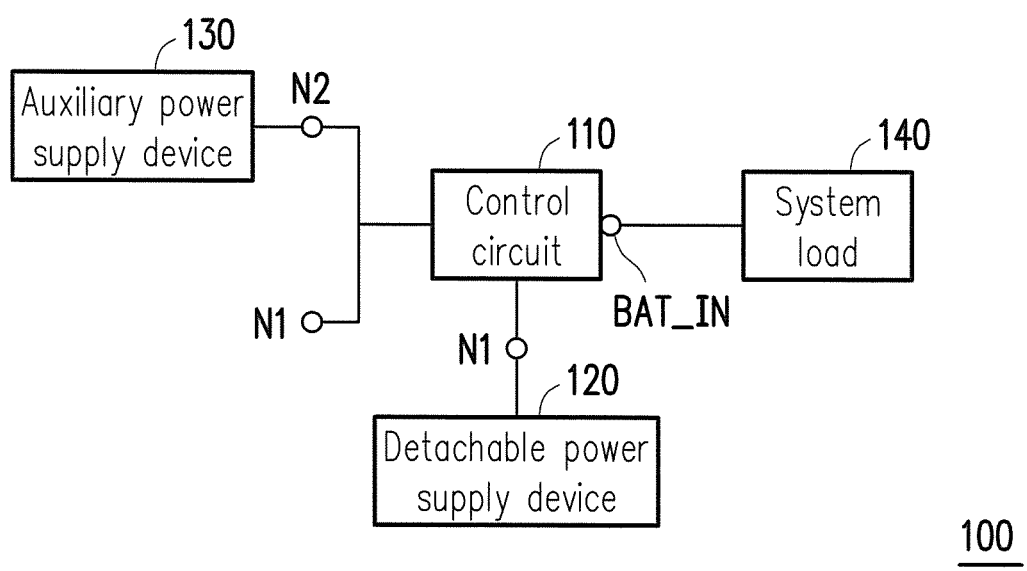
FIG. 1 is a schematic diagram showing an electronic device according to an embodiment of the present invention.

FIG. 1 is a schematic diagram showing an electronic device according to an embodiment of the present invention. An electronic device 100 mainly includes a control circuit 110, a detachable power supply device 120, an auxiliary power supply device 130 and a system load 140. The electronic device 100 may be a computing device, e.g., an industrial computer host, a smart phone, a tablet computer, etc. The detachable power supply device 120 may be a power supply apparatus, e.g., a power regulator, a nickel-metal hydride battery, a lithium battery, etc. The auxiliary power supply device 130 may be a secondary battery, e.g., a rechargeable nickel-cadmium battery, a nickel-metal hydride battery, a lithium-ion battery or the like. The system load 140 may be, for example, a pulse width modulation integrated circuit (PWM IC) or an electronic component in the electronic device. The control circuit 110 is coupled to a power supply terminal BAT_IN, which is coupled to the system load 140. The detachable power supply device 120 has a supply terminal N1. The auxiliary power supply device 130 has a supply terminal N2 and is coupled to the control circuit 110 through the supply terminal N2.

In the present embodiment, when the detachable power supply device 120 has not yet assembled to the electronic device 100, the control circuit 110 is in an off state, and the supply terminal N2 of the auxiliary power supply device 130 is incapable of electrically connecting with the power supply terminal BAT_IN through the control circuit 110. In this case, the auxiliary power supply device 130 is incapable of supplying power to the system load 140, and a user is also unable to turn on the electronic device 100 by using the auxiliary power supply device 130. In this way, the electronic device 100 can be prevented from being turned on when having only the auxiliary power supply device 130 with less power, such that data loss and damage probability may be mitigated for the electronic device 100.

When the detachable power supply device 120 is assembled to the electronic device 100, the supply terminal N1 of the detachable power supply device 120 is coupled to the control circuit 110. In this circumstance, the control circuit 110 may detect that the detachable power supply device 120 is assembled to the electronic device 100 and induce the supply terminal N1 of the detachable power supply device 120 to electrically connect with the power supply terminal BAT_IN through the control circuit 110. Thereby, the electronic device 100 is turned on through the detachable power supply device 120 supplying power to the system load 140. Meanwhile, after the electronic device 100 is turned on, the supply terminal N2 of the auxiliary power supply device 130 is electrically connected with the power supply terminal BAT_IN through the control circuit 110.

On the other hand, when the electronic device 100 is in an on state and the detachable power supply device 120 is removed, the control circuit 110 controls the supply terminal N2 of the auxiliary power supply device 130 to continue electrically connecting with the power supply terminal BAT_IN. The control circuit 110 maintains the on state of both (i.e., the supply terminal N2 and the power supply terminal BAT_IN) and continues supplying power to the system load 140 by using the auxiliary power supply device 130. Thereby, when the detachable power supply device 120 is removed or runs out of power, the power is continuously supplied through the auxiliary power supply device 130, such that the electronic device 100 may avoid encountering data loss due to power exhaustion. In this circumstance, the electronic device 100 may remind the user to replace the detachable power supply device 120 by using an indicator lamp or an alarming sound, and thus, the electronic device 100 may be maintained in a power sufficient state. In other words, when the user replaces the detachable power supply device 120 of the electronic device 100, the electronic device 100 may keep its operation by using the auxiliary power supply device 130.

Figure 2:
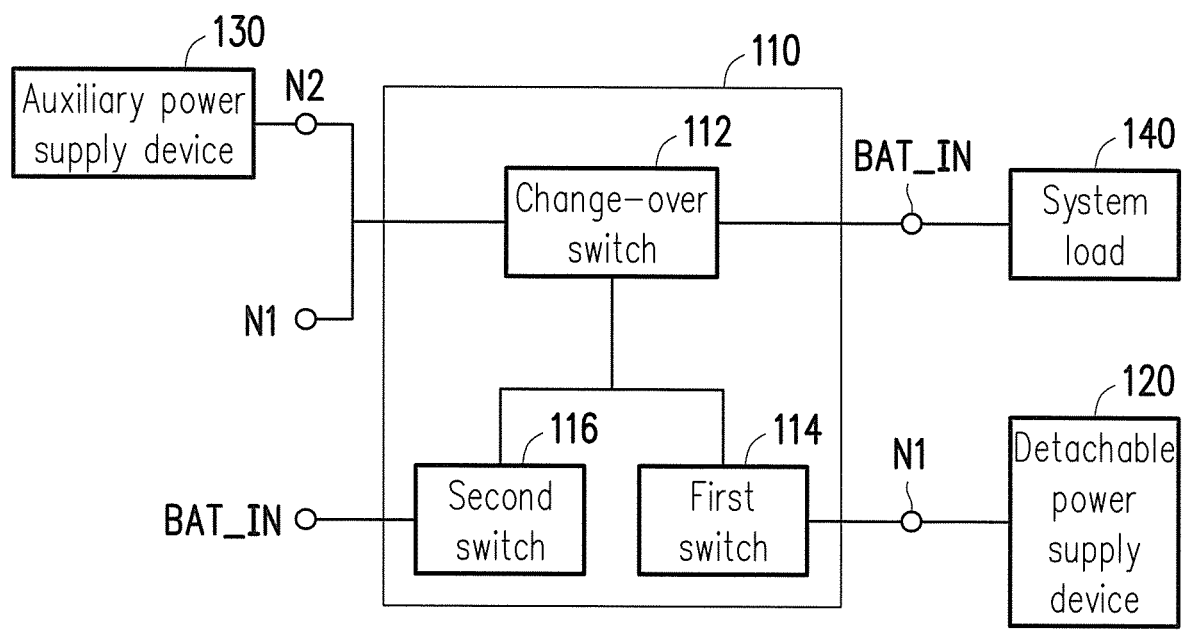
FIG. 2 is a functional block diagram of the control circuit in the electronic device depicted in FIG. 1.

FIG. 2 is a functional block diagram of the control circuit 110 in the electronic device 100 depicted in FIG. 1. FIG. 2 illustrates the function of each functional component in the control circuit 110 depicted in FIG. 1. The control circuit 110 of the embodiment illustrated in FIG. 2 further includes a change-over switch 112, a first switch 114 and a second switch 116. A first terminal of the change-over switch 112 is coupled to the power supply terminal BAT_IN, and a second terminal thereof is coupled to the supply terminal N2 of the auxiliary power supply device 130 and the supply terminal N1 of the detachable power supply device 120. The change-over switch 112 is, for example, a power control integrated circuit (IC). The first switch and the second switch may be electronic components, e.g., diodes, N-type transistors, etc. A first terminal of the first switch 114 is coupled to a control terminal of the change-over switch 112, and when the detachable power supply device 114 is assembled to the electronic device 100, a control terminal of the first switch 114 is coupled to the supply terminal N1 of the detachable power supply device 120. A first terminal of the second switch 116 is coupled to the control terminal of the change-over switch 112, and a control terminal thereof is coupled to the power supply terminal BAT_IN. The first switch 114 and the second switch 116 may be, for example, inverters or N-type transistors, but the invention is not limited thereto.

In the present embodiment, when the detachable power supply device 120 has not yet assembled to the electronic device 100, the change-over switch 112, the first switch 114 and the second switch 116 are all in the off state, and the supply terminal N2 of the auxiliary power supply device 130 is incapable of electrically connecting with the power supply terminal BAT_IN through the change-over switch 112. Thus, the user in this circumstance is unable to turn on the electronic device 100 by using the auxiliary power supply device 130.

When the detachable power supply device 120 is assembled to the electronic device 100, the supply terminal N1 of the detachable power supply device 120 enables the control terminal of the first switch 114 and turns on the first switch 114. After the first switch 114 is turned on, the change-over switch 112 is continuously turned on. Thereby, the detachable power supply device 120 supplies power to the system load 140, so as to turn on the electronic device 100. Meanwhile, after the electronic device 100 is turned on, the power supply terminal BAT_IN enables the control terminal of the second switch 116, and the second switch 116 is turned on to maintain the on state of the change-over switch 112.

When the electronic device 100 is in the on state and the detachable power supply device 120 is removed, the second switch 116 and the change-over switch 112 are maintained in the on state, and the auxiliary power supply device 130 keeps supplying power to the system load 140.

Figure 3:
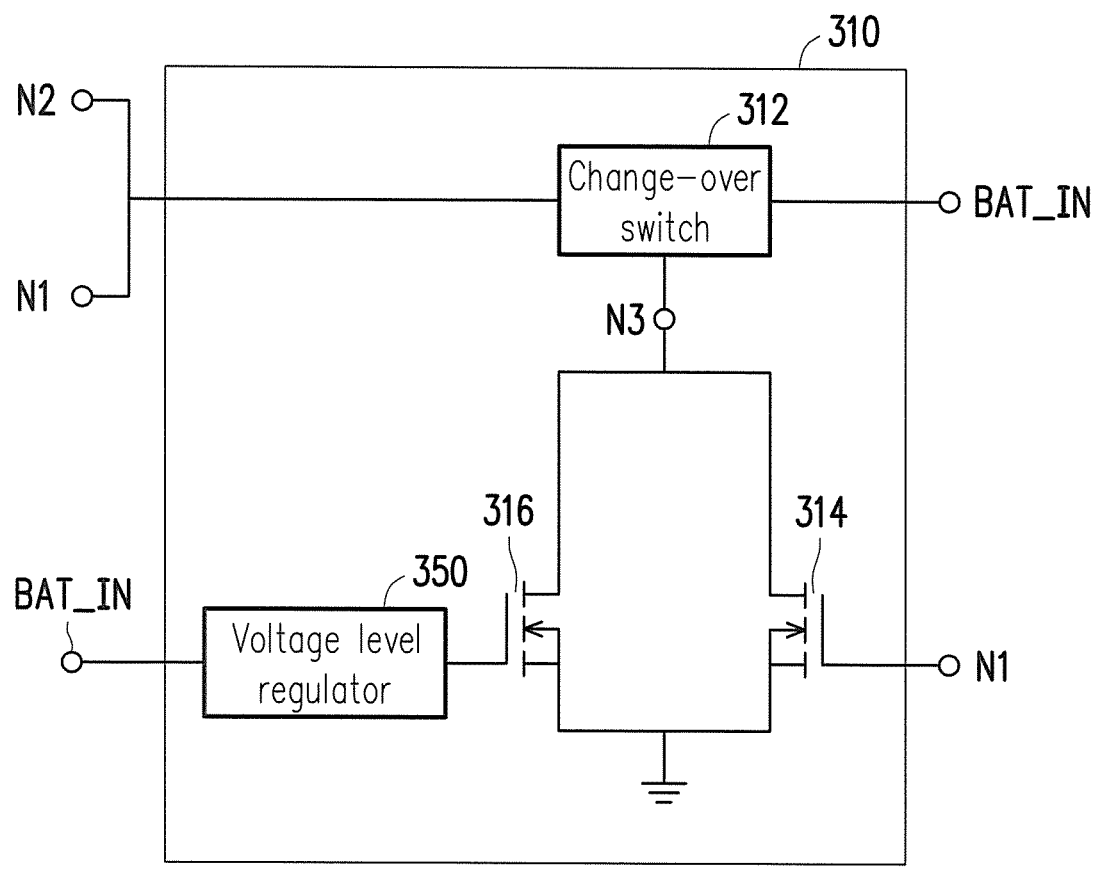
FIG. 3 is a circuit diagram showing a control circuit according to a first embodiment of the present invention.
Figure 4:
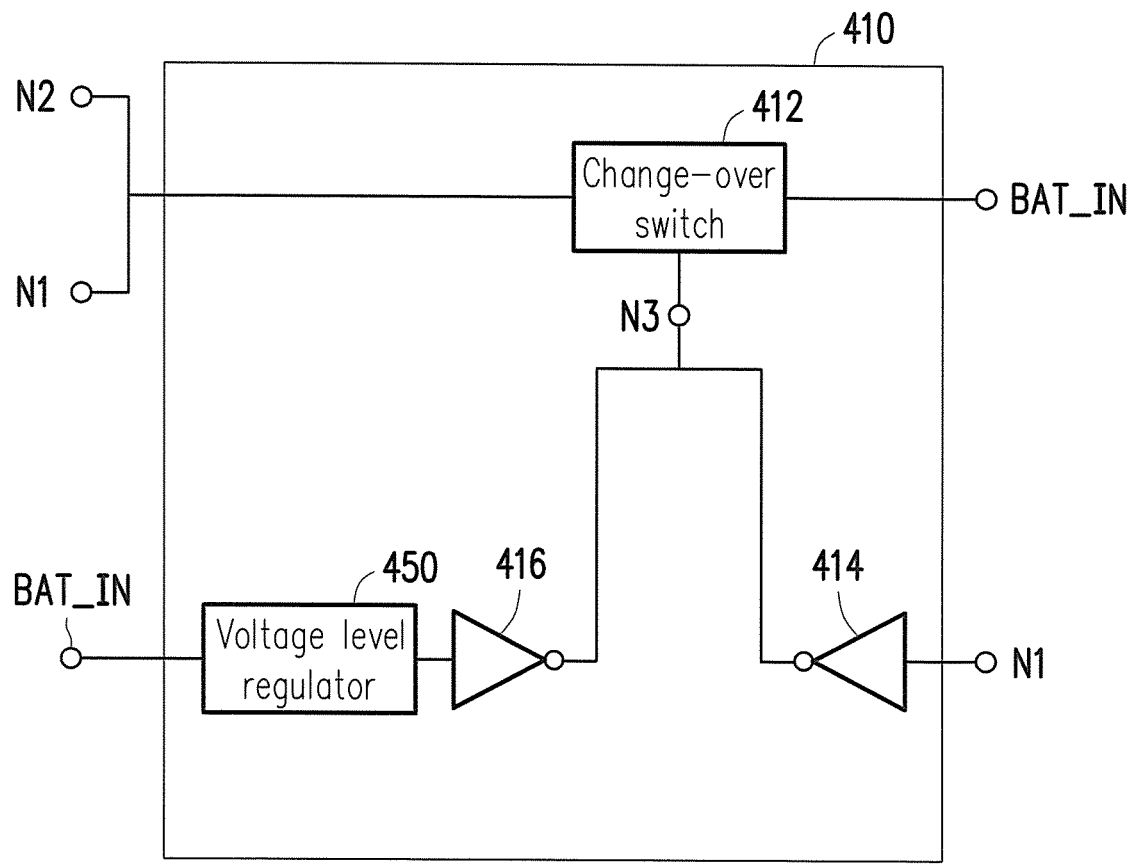
FIG. 4 is a circuit diagram showing a control circuit according to a second embodiment of the present invention.

FIG. 3 is a circuit diagram showing a control circuit according to a first embodiment of the present invention. In order to distinguish different circuit structures of each control circuit, the control circuit of the first embodiment illustrated in FIG. 3 is labeled as 310, and the control circuit of a second embodiment illustrated in FIG. 4 is labeled as 410. The control circuit 310 includes a change-over switch 312, a first switch 314, a second switch 316 and a voltage level regulator 350. In the present embodiment, the first switch 314 and the second switch 316 are N-type transistors. A first terminal of the change-over switch 312 is coupled to the power supply terminal BAT_IN, and a second terminal thereof is coupled to the supply terminal N2 of the auxiliary power supply device and the supply terminal N1 of the detachable power supply device. A drain of the first switch 314 is coupled to a control terminal N3 of the change-over switch 312, and when the detachable power supply device is coupled to the control circuit 310, a gate of the first switch 314 is coupled to the supply terminal N1 of the detachable power supply device. A drain of the second switch 316 is coupled to the control terminal N3 of the change-over switch 312, and a gate thereof is coupled to a first terminal of the voltage level regulator 350. A second terminal of the voltage level regulator 350 is coupled to the power supply terminal BAT_IN.

In the present embodiment, whether the change-over switch 312 is turned on depends on the control terminal N3 of the change-over switch 312. When the control terminal N3 is in a low voltage level, the change-over switch 312 is turned on. Additionally, when the detachable power supply device has not yet coupled to the control circuit 310, the change-over switch 312, the first switch and the second switch 316 are all in the off state, and the supply terminal N2 of the auxiliary power supply device is incapable of electrically connecting with the power supply terminal BAT_IN through the change-over switch 312.

When the detachable power supply device is coupled to the control circuit 310, the detachable power supply device enables the first switch 314 through the supply terminal N1, so as to turn on the first switch 314. The turned-on first switch 314 pulls down the voltage level of the control terminal N3 and further turns on the change-over switch 312. After the change-over switch 312 is turned on, the supply terminal N1 of the detachable power supply device 120 supplies power to the power supply terminal BAT_IN. When a voltage of the power supply terminal BAT_IN is greater than a threshold, the voltage level regulator 350 provides a fixed-level regulated voltage to enable the second switch 316, so as to turn on the second switch 316. When the voltage of the power supply terminal BAT_IN is less than the threshold, the voltage level regulator 350 provides a zero-level voltage, so as to turn off the second switch 316. The voltage level regulator 350 installed in the control circuit 310 may prevent the change-over switch 312 from being turned off due to the voltage of the power supply terminal BAT_IN being unstable. After the change-over switch 312 is turned on, and the detachable power supply in this circumstance is removed, the change-over switch 312 and the second switch are still maintained in the on state, and the supply terminal N1 of the auxiliary power supply device keeps supplying power to the power supply terminal BAT_IN.

FIG. 4 is a circuit diagram showing a control circuit according to a second embodiment of the present invention. The control circuit 410 includes a change-over switch 412, a first switch 414 and a second switch 416. The main difference between the embodiments illustrated in FIG. 4 and FIG. 3 lies in the first switch 414 and the second switch 416 of the embodiment illustrated in FIG. 4 being inverters. When the supply terminal N1 of the detachable power supply device supplies power to the first switch 414, or the power supply terminal BAT_IN supplies power to the second switch 416, the first switch 414 or the second switch 416 outputs a zero-level voltage to the control terminal N3 of the change-over switch 412 to pull down the voltage level of the control terminal N3 and further turn on the change-over switch 412. The component functions of the present embodiment are substantially the same as those of the above embodiments, and thus, the detailed content will not be repeatedly described hereinafter.

Figure 5:
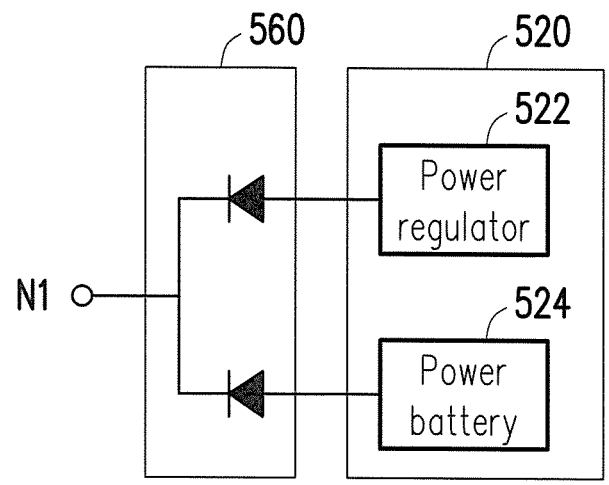
FIG. 5 is a schematic diagram showing a detachable power supply device in an electronic device and its corresponding circuit according to an embodiment of the present invention.

FIG. 5 is a schematic diagram showing a detachable power supply device in an electronic device and its corresponding circuit according to an embodiment of the present invention. A detachable power supply device 520 may include a power regulator 522 and a power battery 524. In an embodiment of the invention, a distributor 560 is installed on the supply terminal N1 of the detachable power supply device 520, such that one of the power regulator 522 and the power battery 524 which is provided with a greater output voltage is selected to serve as output power. An input terminal of the distributor 560 is coupled to the power regulator 522 and the power battery 524, and an output terminal thereof is coupled to the supply terminal N1 of the detachable power supply device. The power regulator 522 and the power battery 524 supply power to the supply terminal N1 of the detachable power supply device through the distributor 560. In the present embodiment, the distributor 560 is composed of two diodes, but the invention is not limited thereto.

Figure 6:
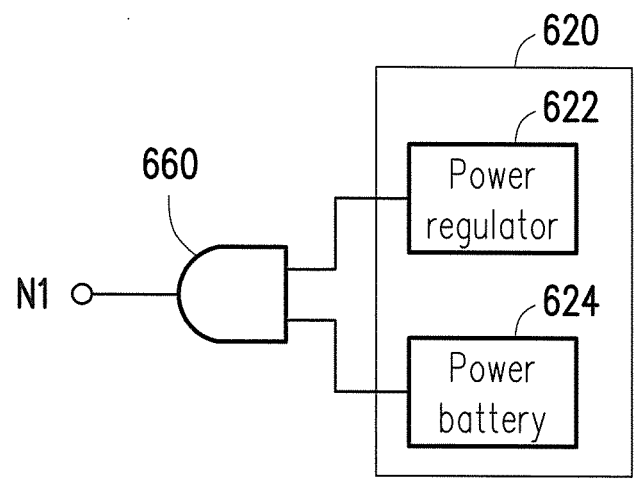
FIG. 6 is a schematic diagram showing the detachable power supply device in the electronic device and its corresponding circuit according to another embodiment of the present invention.

FIG. 6 is a schematic diagram showing the detachable power supply device in the electronic device and its corresponding circuit according to another embodiment of the present invention. The main difference between the embodiments illustrated in FIG. 6 and FIG. 5 lies in a distributor 660 of the embodiment illustrated in FIG. 6 being implemented by an AND gate. An input terminal of the distributor 660 is coupled to a power regulator 622 and a power battery 624, and an output terminal thereof is coupled to the supply terminal N1 of the detachable power supply device. The power regulator 622 and the power battery 624 supply power to the supply terminal N1 of the detachable power supply device through the distributor 660. Thereby, one of the power regulator 622 and the power battery 624 which is provided with a greater output voltage is selected to serve as output power.

Figure 7:
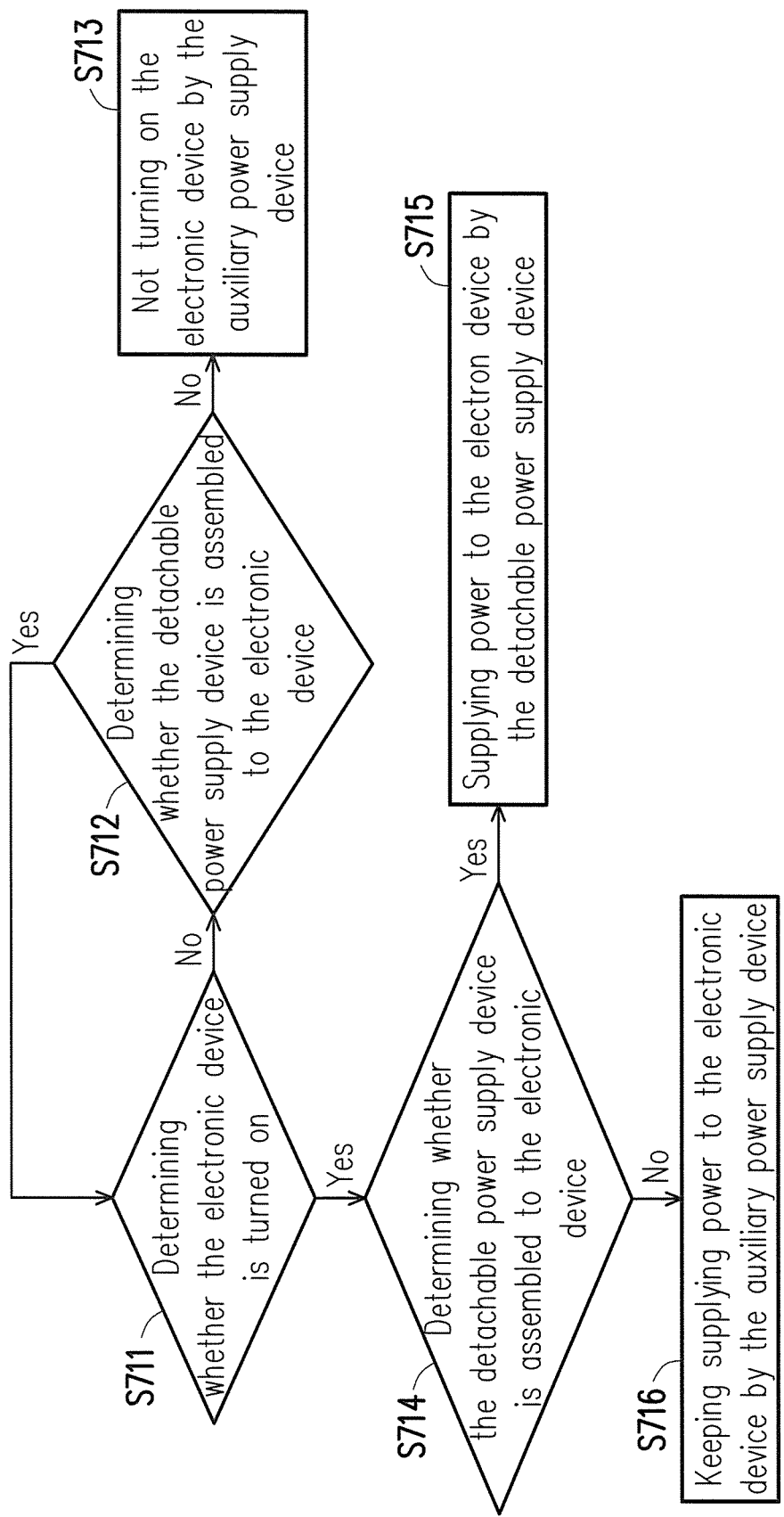
FIG. 7 is a flow chart showing a power supply method of the electronic device 100 according to an embodiment of the present invention.

FIG. 7 is a flow chart showing a power supply method of an electronic device 100 according to an embodiment of the present invention. In step S711, whether the electronic device 100 is turned on is determined. The electronic device 100 includes a detachable power supply device 120 and an auxiliary power supply device 130. If the electronic device 100 is turned off, step S712 is entered, where whether the detachable power supply device 120 is assembled to the electronic device 100 is determined. If the detachable power supply device 120 is assembled to the electronic device 100, the flow is returned back to step S711. If the detachable power supply device 120 has not yet assembled to the electronic device 100, step S713 is entered, where the electronic device 100 is not turned on by the auxiliary power supply device 130. In step S711, if the electronic device 100 is turned on, step S714 is entered, where whether the detachable power supply device 120 is assembled to the electronic device 100 is determined. If the detachable power supply device 120 is assembled to the electronic device 100, step S715 is entered, where power is supplied to the electronic device 100 by the detachable power supply device 120. If the detachable power supply device 120 is not assembled to the electronic device 100, step S716 is entered, where power continues to be supplied to the electronic device 100 by the auxiliary power supply device 130. Details related to the aforementioned steps may refer to the embodiments above.

Based on the above, in the electronic device and the power supply method thereof according to the invention, an auxiliary power supply device is additionally installed in the electronic device, and through the specially designed circuit, the electronic device is restricted to be turned on only by the detachable power supply device, instead of being turned on by using the power of the auxiliary power supply device alone. In this way, the portable electronic device being turned on by a user using the auxiliary power supply device with less power can be prevented, such that the storage capacity of the auxiliary power supply device can be maintained to avoid the accident of data loss caused by power exhaustion. Moreover, during the operation of the electronic device, the electronic device can be maintain in the on state by using the auxiliary power supply device if the detachable power supply device is removed. Thereby, the electronic device does not have to be shut down and re-started during the replacement of the detachable power supply device, so as to avoid the accident of data loss caused by power exhaustion.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
    an auxiliary power supply device;
    a detachable power supply device; and
    a control circuit, coupled to a power supply terminal, wherein the power supply terminal is coupled to a system load, and the control circuit comprises:
        a change-over switch, having a first terminal coupled to the power supply terminal and a second terminal coupled to a supply terminal of the auxiliary power supply device;
        a first switch, having a first terminal coupled to a control terminal of the change-over switch, and a control terminal of the first switch being coupled to the supply terminal of the detachable power supply device when the detachable power supply device is assembled to the electronic device; and
        a second switch, having a first terminal coupled to the control terminal of the change-over switch and a control terminal coupled to the power supply terminal, wherein
    when the detachable power supply device is assembled to the electronic device, the first switch is turned on to turn on the change-over switch, the second switch maintains the change-over switch in a conducting state, and the detachable power supplies power to the system load;
    wherein when the electronic device is not turned on and the detachable power supply is removed from the electronic device, the change-over switch is not in a conducting state, and the control circuit does not turn on the electronic device by using the auxiliary power supply device, and
    when the electronic device is in an on state and the detachable power supply is removed from the electronic device, the changer-over switch is in the conducting state, and the second switch of the control circuit is continuously turned on to maintain the change-over switch in a conducting state, so as to keep supplying power to the electronic device by using the auxiliary power supply device.

2. The electronic device according to claim 1, wherein the control circuit further comprises:
    a voltage level regulator, coupled to the power supply terminal and the control terminal of the second switch, wherein
    when a voltage of the power supply terminal is greater than a threshold, the voltage level regulator provides a fixed-level regulated voltage to the control terminal of the second switch, and
    when the voltage of the power supply terminal is less than the threshold, the voltage level regulator provides a zero-level voltage to the control terminal of the second switch to turn off the second switch and the change-over switch, so as to turn off the electronic device.

3. The electronic device according to claim 1, wherein the first switch and the second switch are implemented by inverters or N-type transistors.

4. The electronic device according to claim 1, wherein the change-over switch is implemented by a power control integrated circuit (IC).

5. The electronic device according to claim 1, wherein the detachable power supply device is one or a combination of a power converter and a power battery.

6. The electronic device according to claim 5, further comprising:
    a distributor, disposed between the control circuit and the detachable power supply device, wherein one or a combination of the power converter and the power battery supplies power to the supply terminal of the detachable power supply device through the distributor.

7. The electronic device according to claim 1, wherein when the detachable power supply device is assembled to the electronic device, the auxiliary power supply device is charged through the detachable power supply device.

8. A power supply method of an electronic device, comprising:
    determining whether the electronic device is turned on, wherein the electronic device comprises a detachable power supply device, an auxiliary power supply device, and a control circuit, wherein the control circuit comprises a change-over switch, a first switch, and a second switch, a first terminal of the change-over switch is coupled to a system load of the electronic device, a second terminal of the change-over switch is coupled to the auxiliary power supply device, a first terminal of the first switch is coupled to the change-over switch, a control terminal of the first switch is coupled to the detachable power supply device when the detachable power supply device is assembled to the electronic device, a first terminal of the second switch is coupled to the change-over switch, and a control terminal of the second switch is coupled to the system load;
    when the electronic device is not turned on and the detachable power supply is removed from the electronic device, tuning off the change-over switch, the first switch, and the second switch, and not turning on the electronic device by the auxiliary power supply device;
    when the detachable power supply device is assembled to the electronic device, turning on the change-over switch by the first switch, maintaining the change-over switch being turned on by the second switch, turning on the electronic device by the detachable power supply device, and supplying power to the electronic device; and when the electronic device is in an on state and the detachable power supply is removed from the electronic device, continuously turning on the second switch to maintain the change-over switch being turned on, and keeping supplying power to the electronic device by the auxiliary power supply device.

9. The method according to claim 8, wherein the change-over switch is continuously turned on to supply power to the electronic device by using the power provided by the auxiliary power supply device, the detachable power supply device or both when the electronic device is in the on state.

10. The method according to claim 8, wherein the change-over switch is continuously turned on when an output voltage of the electronic device is greater than a threshold, and the change-over switch is turned off to turn off the electronic device when the output voltage of the electronic device is less than the threshold.

11. The method according to claim 8, wherein the auxiliary power supply device is charged through the detachable power supply device when the detachable power supply device is assembled to the electronic device.

* * * * *